E. J. WOODFORD.
PORTABLE FENCE.
APPLICATION FILED FEB. 17, 1912.
1,038,470.
Patented Sept. 10, 1912.
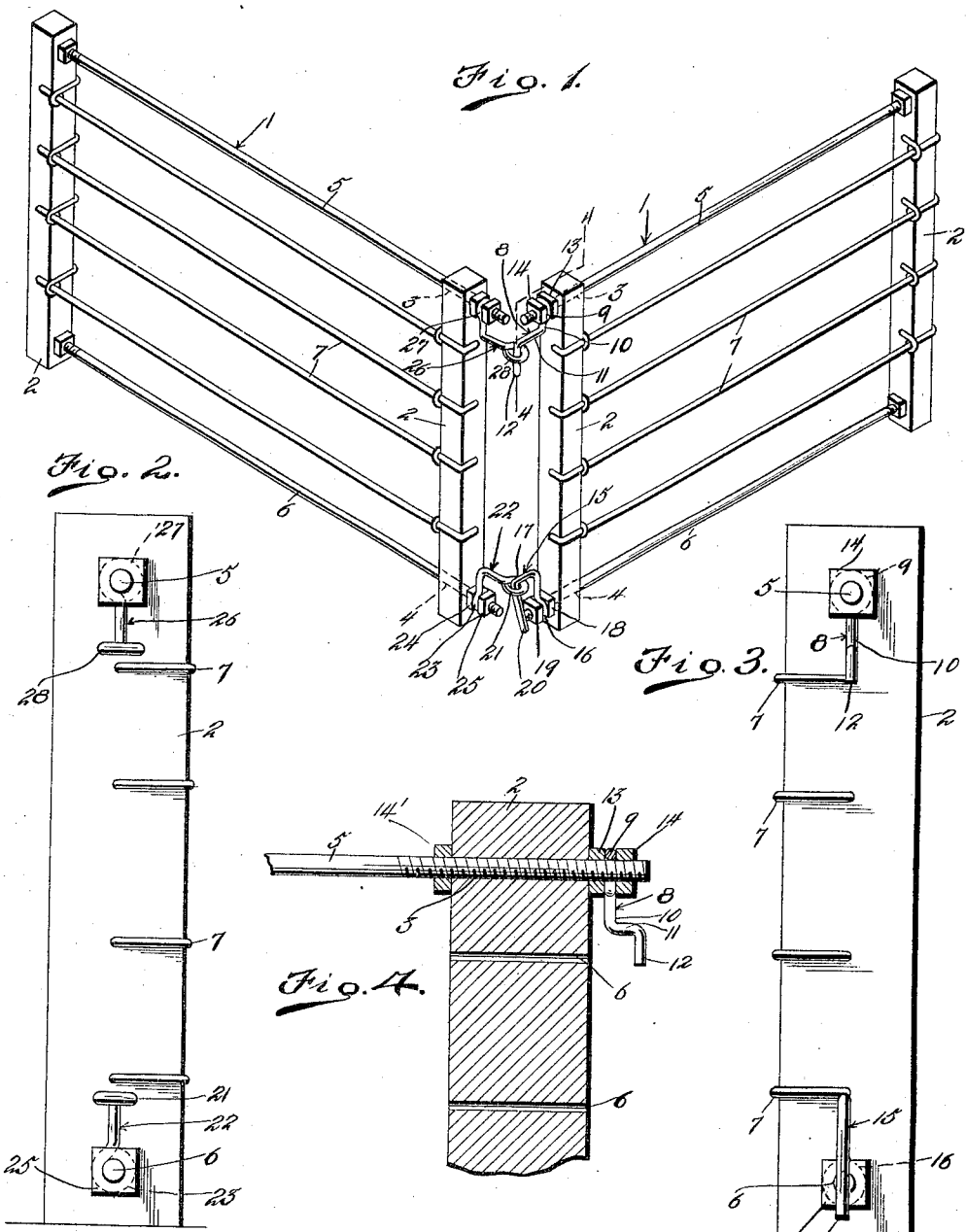

UNITED STATES PATENT OFFICE.

ELBERT J. WOODFORD, OF CANDOR, NEW YORK.

PORTABLE FENCE.

1,038,470.   Specification of Letters Patent.   Patented Sept. 10, 1912.

Application filed February 17, 1912. Serial No. 678,381.

*To all whom it may concern:*

Be it known that I, ELBERT J. WOODFORD, a citizen of the United States, residing at Candor, in the county of Tioga, State of New York, have invented certain new and useful Improvements in Portable Fences; and I do hereby declare the following to be a full, clear, and exact description of the invention, such as will enable others skilled in the art to which it appertains to make and use the same.

This invention relates to improvements in portable fences, which may be easily taken down and set up, and so constructed that the sections may be compactly folded for transportation or storage.

With these and other objects in view, the invention consists in certain novel features of construction, combination and arrangement of parts as will be hereinafter fully described and claimed.

In the drawing: Figure 1 is a perspective view of a plurality of connected sections forming the fence. Fig. 2 is an end view of one of the sections, and which carries the eyes. Fig. 3 is a similar view of one of the sections which carries the hooks. Fig. 4 is a detailed view on line 4—4 of Fig. 1.

Referring to the drawing, the numeral 1 designates one of the sections, and as each section is constructed in a manner similar to section 1, the description thereof will suffice for the other section. Each section consists of end posts 2, which may be formed from metal or wood, as desired, and which are provided near their upper and lower ends with perforations 3 and 4 respectively, in which are mounted the threaded ends of metal rods 5 and 6. The posts 2 are further formed with a plurality of spaced perforations 6 in which are secured the ends of the line wires 7. It is obvious that wire mesh may be substituted for the line wires 7 if desired.

Adapted to engage the projecting threaded end of the upper rod 5 is a hook 8, the same being formed from a single length of stout wire, consisting of an eye 9, by which the same engages said rod. The eye 9 terminates in a downwardly extended shank 10, which in turn terminates in a horizontally disposed portion 11, thus producing an offset 12. To prevent accidental removal of the hook 8, nuts 13 and 14 are provided, said nuts being received by the threaded end of the rod 5. From this construction it will be seen that upon manipulation of the nuts 13 and 14 simultaneous with the adjustment of the nut 14′, also mounted on the rod 5 the upper ends of the posts 2 may be moved backwardly or forwardly upon the rods 5 to tighten the line wires 7, and when adjusted, the nuts 14 serve as a lock to prevent accidental rotation of the rod 5.

Mounted upon the projected end of the rod 6 is a hook 15, the said hook being disposed directly under the hook 8 and being also formed from stout wire and provided with an eye 16 for engaging the extreme outer threaded end of the rod 6. The eye 16 terminates in a loop 17, said hook being held in its proper position by nuts 18 and 19, said nuts being operable in the same manner, as the nuts 13 and 14. It will be noted that the free end 20 of the loop 17 is adapted to bear against the outer end of the rod 6, and has sufficient resiliency to be sprung into the eye 21 formed upon the upper end of the eye member 22, said member being angular and having formed at its lower end an eye 23, by which the same is connected to one end of the rod 6. The eye member 22 is held in its proper adjusted position by nuts 24 and 25, the same being operable in a manner similar to the nuts hereinbefore mentioned. A similar eye member 26 is connected to the outer end of the rod 5, and is constructed in a similar manner to the eye member 22, said member being provided with an eye 27, by which the same is supported upon the rod 5. The member 26 is further provided with the angularly disposed eye 28, the same being in alinement with the eye 21 of the eye member 22. The eye members 22 and 26 are adapted to receive the off-set 12 of the hook member 8 and the offset 20 of the hook 15, respectively. Thus it will be seen that each section being provided at one end with hook members and the other end with eye members the same may be easily and quickly connected, and when connected the free end 20 of the loop 17 resiliently engages the end of the rod 6, thus preventing the accidental disconnection of the sections but at the same time permitting the sections to be disconnected upon springing of the end 20 of the loop to permit the same to pass from the eyes 21.

The fence when set up is arranged preferably in zigzag form. Thus it will be seen that a fence constructed in this manner may be erected without the aid of nails or tools of any description.

What is claimed is:

A fence comprising a plurality of sections, each section consisting of a pair of posts having their upper and lower ends formed with perforations for receiving the threaded ends of upper and lower rods respectively, eye members connected to one of said rods, a hook member connected to one end of the upper rod, a similar member connected to the lower rod and having its free end adapted to resiliently engage the end of the rod to which it is connected, means for adjusting the posts longitudinally upon the rods, and means for holding the same in their adjusted positions, said sections being adapted to be connected when the hook members of one section engage the eye members of the adjoining section.

In testimony whereof, I affix my signature, in presence of two witnesses.

ELBERT J. WOODFORD.

Witnesses:
WILL L. BEEBE,
MABEL M. ROBISON.

Copies of this patent may be obtained for five cents each, by addressing the "Commissioner of Patents, Washington, D. C."